J. A. RICARD.
TRANSMISSION MECHANISM.
APPLICATION FILED APR. 10, 1912.
1,069,473.
Patented Aug. 5, 1913.
Fig. 1
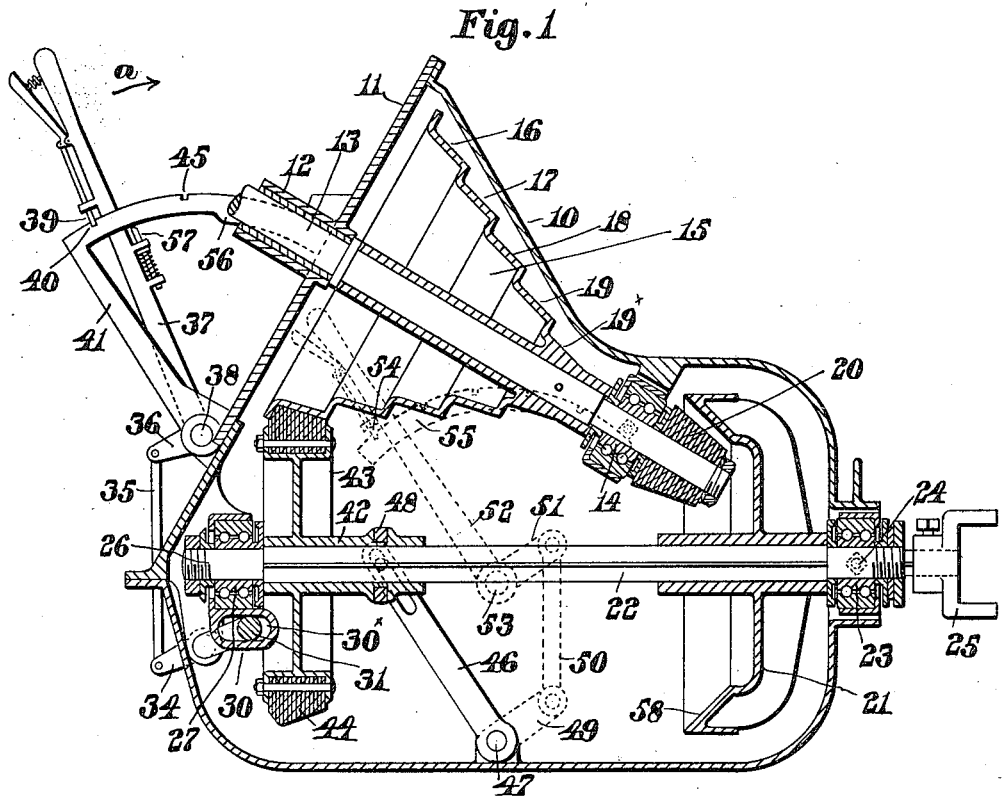
Fig. 2.
Fig. 3.
Fig. 4.
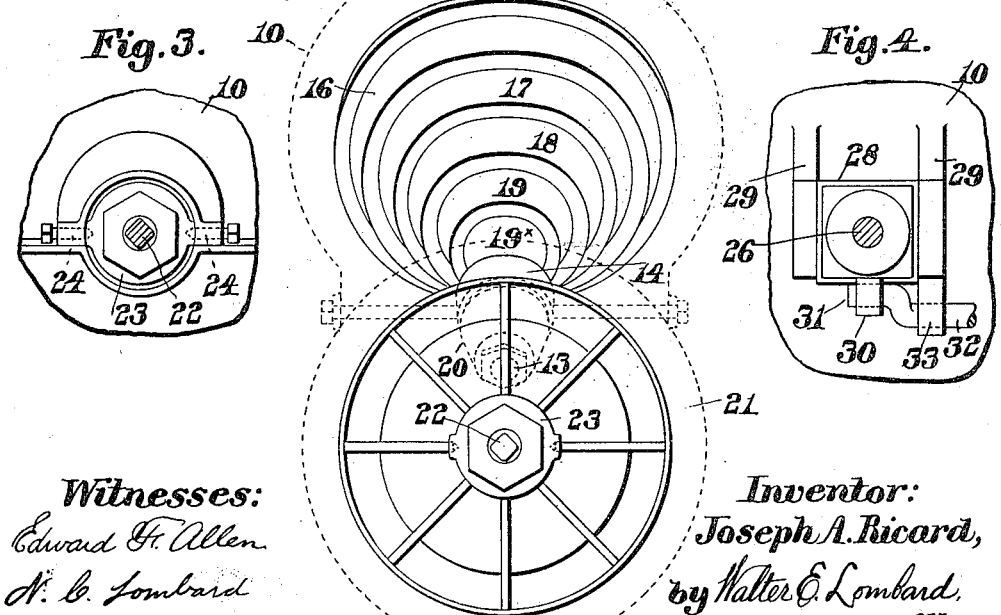
Witnesses:
Edward F. Allen
N. C. Lombard
Inventor:
Joseph A. Ricard,
by Walter E. Lombard,
Atty.

UNITED STATES PATENT OFFICE.

JOSEPH A. RICARD, OF BOSTON, MASSACHUSETTS.

TRANSMISSION MECHANISM.

1,069,473.

Specification of Letters Patent.

Patented Aug. 5, 1913.

Application filed April 10, 1912. Serial No. 689,896.

*To all whom it may concern:*

Be it known that I, JOSEPH A. RICARD, a citizen of the United States of America, and a resident of Boston, in the county of Suffolk and State of Massachusetts, have invented certain new and useful Improvements in Transmission Mechanism, of which the following is a specification.

This invention relates to mechanisms for the transmission of power and has for its object the production of a mechanism of this class in which the power may be transmitted at varying speed and in which provision is also made for a reversal of movement.

The invention consists primarily in two revoluble shafts adapted to be moved into various inclinations to each other, one of said shafts being provided with two members one having a peripheral friction surface while the other is provided with an internal friction surface, the other shaft having coacting members revoluble therewith either of which is adapted to be brought into contact with its companion member at will.

The invention further consists in providing one of said members with a plurality of steps and means for moving a companion member into position to coact with either step.

The invention further consists in certain novel features of construction and arrangement of parts which will be readily understood by reference to the description of the drawings and to the claims hereinafter given.

Of the drawings: Figure 1 represents a section of a mechanism embodying the features of the present invention. Fig. 2 represents an end view of the same with the casing shown in dotted lines. Fig. 3 represents an end view of the pivoted bearing for one of the shafts, and Fig. 4 represents an elevation of the sliding block provided with a bearing for said shaft and the crank for operating it.

Similar characters designate like parts throughout the several figures of the drawings.

In the drawings, 10 is a casing having secured thereto a cover 11 provided with a hub 12 in which is mounted a revoluble shaft 13 extending into the interior of said casing 10, which casing is provided with a bearing 14 for the inner end of said shaft. Between the bearing 14 and the hub 12, and secured to said shaft 13 is a conical wheel 15 provided with a plurality of steps 16, 17, 18, 19, and 19×. To the extreme inner end of the shaft 13 is secured a cone member 20 made up of a plurality of disks of fiber board or other suitable material. This cone member 20 extends within an annular member 21 secured to the squared shaft 22. This squared shaft 22 is revoluble within a bearing 23 pivoted at 24 to one end of the casing 10, as indicated in Figs. 1 and 3 of the drawings. Its outer end is provided with a coupling member 25 which may be connected with a similar coupling member to form a universal joint to transmit power to any suitable point. The opposite and inner end of the squared shaft 22 is provided with a reduced portion 26 extending through a bearing 27 mounted in a block 28 adapted for vertical movement between the flanges 29 formed upon the inner wall of the casing 10. This block 28 is provided with a slotted extension 30 through the slot 30× of which extends the crank arm 31 formed upon an oscillating shaft 32 mounted in a bearing in an ear 33 formed upon one of the inwardly extending flanges 29. The opposite end of said shaft 32 is provided with a lever 34 connected by a link 35 with an arm 36 formed upon a lever 37 pivoted at 38 to the casing 10. This lever 37 is movable about the pivot 38 and is provided with a locking device 39 normally engaging with the notch 40 in a segment 41.

Mounted upon and movable lengthwise of the squared shaft 22 is the hub 42 of a wheel 43 the periphery of which is provided with a plurality of annular members 44 of fiber board or some other suitable friction material. The periphery of these annular members 44 is adapted to engage with any one of the steps 16, 17, 18, 19, or 19× of the cone driving member 15, and owing to the inclination of the peripheral surface of these annular members and the peripheral surface of each of the steps 16 to 19×, frictional contact throughout the width of said wheel is insured at all times and when the friction wheel 43—44 is in engagement with one of the steps 16 to 19×, it is prevented from accidental movement lengthwise of said squared shaft 22. When, however, it is desired to change the speed of the shaft 22, while permitting the shaft 13 to continue at approximately the same speed, the lever 37 is moved in the direction of the arrow $a$ on Fig. 1 until the locking device 39 engages with the notch 45. This movement will cause the crank 31 to move the block 28 downwardly until the friction members 44 are disengaged sufficiently from the step 16 to permit the movement of the hub 42 of the wheel 43 lengthwise of the shaft 22. This is accomplished by means of a lever 46 pivoted at 47 to the casing 10, the free end of which engages a collar 48 in a groove formed in the hub 42. The end of the shaft 47 extends beyond the casing 10 and has secured thereto an arm 49 connected by a link 50 to another arm 51 formed upon a lever 52 pivoted at 53 to the casing 10. This lever 52 is provided with a locking member 54 engaging notches in a segment 55 upon the outside of the casing 10. The notches in the segment 55 correspond to the various steps 16 to $19^x$ so that when the locking device 54 is in engagement with one of these notches the peripheral surface of the friction members 44 is in engagement with the corresponding step 16 to $19^x$ upon the cone driving member 15. The segment 41 is provided with a projection 56 with which the spring pressed member 57 comes in contact when the locking device 39 on the lever 37 registers with the notch 45, thereby providing a stop for the lever 37 in the direction of the arrow $a$ on Fig. 1 of the drawings. When, however, it is desired to reverse the movement of the shaft 22, pressure applied upon the lever 37 will cause the spring pressed member 57 to be moved endwise so that a continued movement of the lever 37 in the direction of the arrow $a$ is permitted. This continued movement of the lever will move the shaft 22 about its pivot 24 to a greater inclination to the shaft 13 and bring the friction surface 58 formed upon the annular member 21 into contact with the cone member 20, so that the rotary movement of said cone member 20 will cause the rotation of said annular member 21 and shaft 22 to which it is secured in the opposite direction. This makes a very simple transmission mechanism particularly adapted for use in connection with motor cars and launches and numerous other purposes.

It is obvious that the details of the construction may be modified in many particulars without altering the principles of the present invention.

It is believed that the operation and many advantages of the invention will be fully understood from the foregoing.

Having thus described my invention, I claim:

1. In a power transmission mechanism, the combination of a revoluble shaft; a stepped wheel thereon and revoluble therewith; a friction wheel secured to said shaft; a second revoluble shaft; a slidable bearing for one end thereof; a pivoted bearing for the opposite end of said second shaft; means for moving said second shaft about the pivot of said pivoted bearing; a friction wheel revoluble with said second shaft and slidable thereon; a member secured to said second shaft provided with an internal conical surface adapted to coact with said friction wheel on said first shaft; and means for moving said friction wheel on said second shaft into position to coact with either of the steps of said stepped wheel.

2. In a power transmission mechanism, the combination of two revoluble shafts adapted to be positioned at various inclinations to each other; a stepped conical wheel on one of said shafts; a friction cone on the end of said shaft; a friction wheel revoluble with and movable lengthwise of the other shaft and adapted to engage either step of said conical wheel; and an annular member on said second shaft having an internal frictional surface with which said cone is adapted to coact to reverse the motion of said second shaft.

3. In a power transmission mechanism, the combination of two revoluble shafts adapted to be positioned at various inclinations to each other; means on said shaft to transmit motion from one to the other at different speeds; a member secured to one of said shafts; and movable means on the other shaft adapted to coact with said member to reverse the motion of the driven shaft.

4. In a power transmission mechanism, the combination of two revoluble shafts adapted to be positioned at various inclinations to each other; means on said shafts to transmit motion from one to the other at different speeds; a cone member on one of said shafts; and an annular member on the other shaft adapted to be moved into contact with said annular member to reverse the motion of the driven shaft.

Signed by me at 4 Post Office Sq., Boston, Mass., this 28th day of March, 1912.

JOSEPH A. RICARD.

Witnesses:
 WALTER E. LOMBARD,
 NATHAN C. LOMBARD.

Copies of this patent may be obtained for five cents each, by addressing the "Commissioner of Patents, Washington, D. C."